E. H. YOUNG.
COTTON DELINTER.
APPLICATION FILED DEC. 22, 1917.

1,319,199.

Patented Oct. 21, 1919.
9 SHEETS—SHEET 3.

Fig. 3

E. H. YOUNG.
COTTON DELINTER.
APPLICATION FILED DEC. 22, 1917.

1,319,199.

Patented Oct. 21, 1919.
9 SHEETS—SHEET 4.

Fig. 4

Inventor:
Edwin H. Young,
By Hugh T. Wagner,
Attorney.

E. H. YOUNG.
COTTON DELINTER.
APPLICATION FILED DEC. 22, 1917.

1,319,199.

Patented Oct. 21, 1919.
9 SHEETS—SHEET 6.

Inventor:
Edwin H. Young,
By Hugh K. Wagner
Attorney.

E. H. YOUNG.
COTTON DELINTER.
APPLICATION FILED DEC. 22, 1917.

1,319,199.

Patented Oct. 21, 1919.
9 SHEETS—SHEET 7.

UNITED STATES PATENT OFFICE.

EDWIN H. YOUNG, OF DALLAS, TEXAS.

COTTON-DELINTER.

1,319,199. Specification of Letters Patent. Patented Oct. 21, 1919.

Application filed December 22, 1917. Serial No. 208,516.

*To all whom it may concern:*

Be it known that I, EDWIN H. YOUNG, a citizen of the United States, residing at the city of Dallas, in the county of Dallas and State of Texas, have invented certain new and useful Improvements in Cotton-Delinters, of which the following is a specification.

Using the terminology of persons especially familiar with such matters, cotton that has been picked is first ginned, then linted, and then delinted. The first of these said operations is performed in or by a gin, the second by a linter or linting machine, and the third by a delinter or delinting machine.

As is well known, both the seed and the cotton or lint removed therefrom are put to important uses. For their separate uses, each is in better and more serviceable state the more thoroughly the seed has been freed from the lint or last traces of cotton clinging thereto.

Heretofore machines have been suggested that theoretically give promise of unusual efficiency in delinting cotton seed, but upon trial the same have been found unsatisfactory and unsuccessful.

The object of the present invention is primarily to provide a machine which will entirely free the cotton seed from the last traces of lint, and that the machine herein described will produce that result has been determined by practical demonstration in actual practice. Other features of invention reside in the construction of particular parts, but the whole conduces to the aforesaid object and to the production of a simple, efficient, durable, and relatively inexpensive machine which in the most convenient manner handles the cotton seed before and after the delinting operation and also so handles the lint as to prevent waste thereof.

Another feature of this invention is the process or method of handling the product of the delinting operation in such manner that the same can be mixed with the product of the limiting operation and thus saved for commercial use or whereby the said two products can be handled separately and the product of each preserved for suitable uses.

Due to the machine hereinbefore described, the seed can be entirely freed from lint, which makes it possible to make undecorticated cotton seed cake, which amounts to about fifteen hundred and fifty (1550) pounds from a ton of seed, which cake is as commercially salable as decorticated cake and at comparatively better prices, it being found more remunerative to manufacture undecorticated cake than to manufacture decorticated cake and throw away the hulls or sell the hulls separately, as is now being done.

Perfectly cleaned seed entirely free from lint have long been desired by those engaged in the industry of crushing cotton seed, but its production has been found extremely difficult because while it is necessary to force the seed against the delinting rolls if too much pressure is applied to the seed the hulls become broken and they are ground away from the cotton seed meats. On the other hand, if insufficient pressure is applied to the seed, very little of the lint is removed from the seed.

This machine provides improved means for so feeding the seeds through the machine that a uniform pressure upon the seeds will be maintained at all times, whereby they are forced uniformly into contact with the delinting rolls with that degree of pressure which has been found to be most effective for removing practically all of the lint without injury to the hulls. This uniform pressure of the seeds against the delinting rolls is produced by maintaining in the delinting chamber a predetermined and uniform quantity of seed, regardless of any variation in the feed of the cotton seed into the machine.

In the accompanying drawings forming part of this specification in which like numbers of reference denote like parts wherever they occur.

Figure 1:
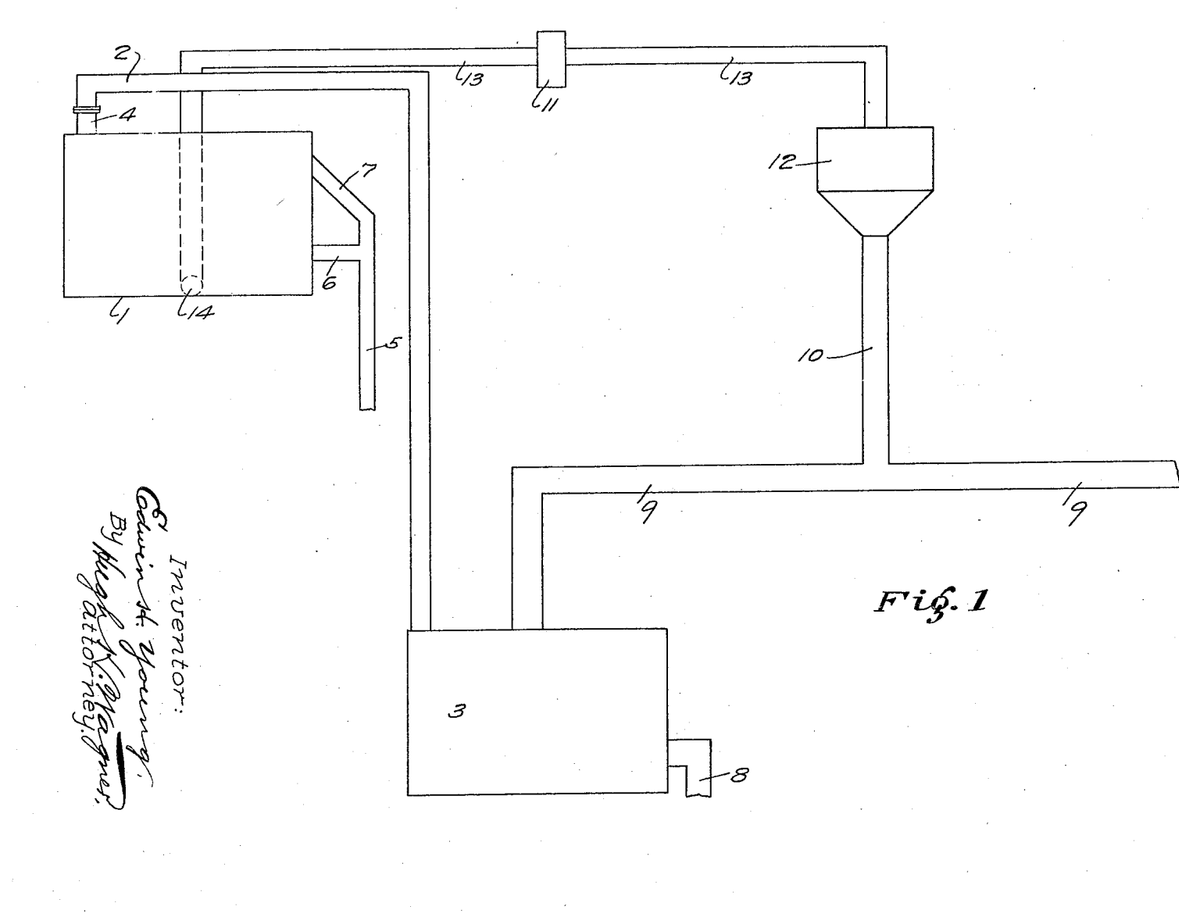
Figure 1 is a diagrammatic view illustrating the above-mentioned process of linting, delinting, mixing, etc.

The delinter 1 that forms the machine subject-matter of this invention is connected by pipe 2 with the linter 3, which pipe 2 feeds the linted cotton seed from linter 3 into the hopper 4 of the delinter 1. The cleaned seed is discharged from the delinter 1 through the pipe 5 having the branches 6 and 7.

The lint is discharged from the linter 3 through pipe 8. Pipe 9 conveys the seed from the bin or other seed supply to the linter 3. Pipe 10 connects with pipe 9 and feeds into it the lint drawn by fan 11 and dust-collector 12 through pipe 13 from the exit 14 from the delinter 1. The delinter 1 is not necessarily-combined in a system of apparatus such as just described, but may be used separately, having any suitable source of linted seeds and a suitable discharge for the lint removed therefrom, as well as for the clean seeds. When used as hereinbefore described, however, convenient handling of the lint removed from the seeds by the delinter 1 is provided and means for causing that lint which is of a very light and fine quality to be mixed with the relatively coarser and less desirable lint that is removed from the seed by the linter 3, which mixture raises the average quality of the lint discharged through pipe 8 of linter 3. At present much of the lint that is removed from the seeds by the delinter 1 is entirely wasted, because of the inefficiency of previously known delinters, the same being mixed in with the hulls which sell at a relatively low price compared to the price paid for the product either of linting or delinting. In the practice of the process just described in which the lint from delinter 1 is conveyed by pipes 13 and 10 to be fed through pipe 9 with fresh seed to linter 3, not only is lint from delinter 1 saved but its quality raises the average quality of the lint discharged from linter 3 through pipe 8 so that the said product can be sold for a higher price than if the same had not been so mixed.

The roll 15 is formed of material made by the silicate of soda process and baked and contains aluminous abrasive material embedded therein. Unlike abrasive rolls in former delinters which required sharpening from time to time to keep them in approximately serviceable condition, the abrasive roll 15 of this apparatus is self-sharpening, as the frictional contact of the seed with its surface constantly tends to wear the same away, though with only slight and almost imperceptible effect, which effect is however sufficient gradually and constantly to expose the said aluminous abrasive particles and thus to maintain the abrasive roll 15 in proper condition for its desired action.

The delinting chamber 16 is formed around abrasive roll 15 by a plurality of rolls 17, preferably four in number, arranged parallel to each other, the spaces between which are closed by strips or staves 18 formed of the T-member 19 and the knives 20.

Figure 2:
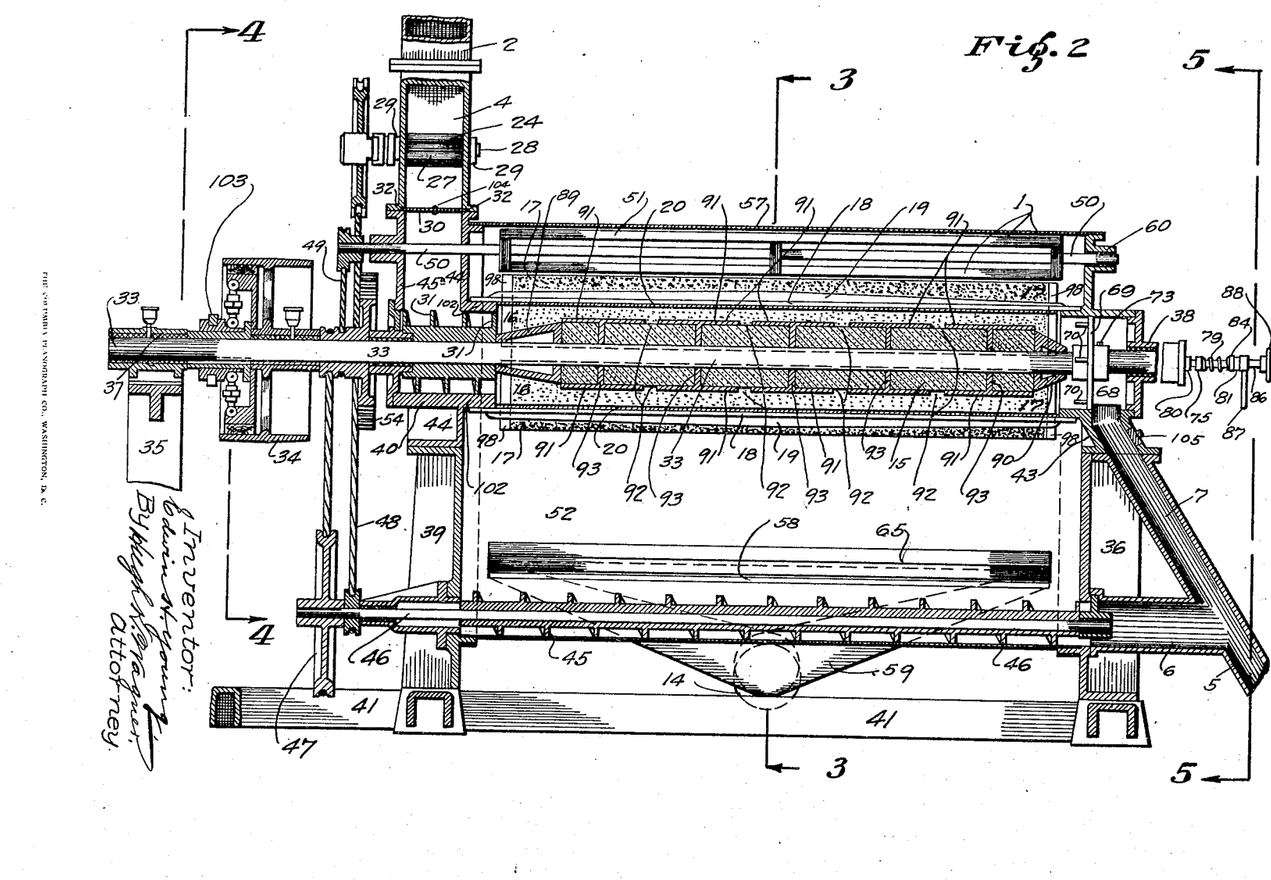
Fig. 2 is a sectional view on the line 2—2 in Figs. 3, 4, 5, and 6, looking in the direction of the arrows.
Figures 7, 8, 9, 10, 11, 12, 13, 14:
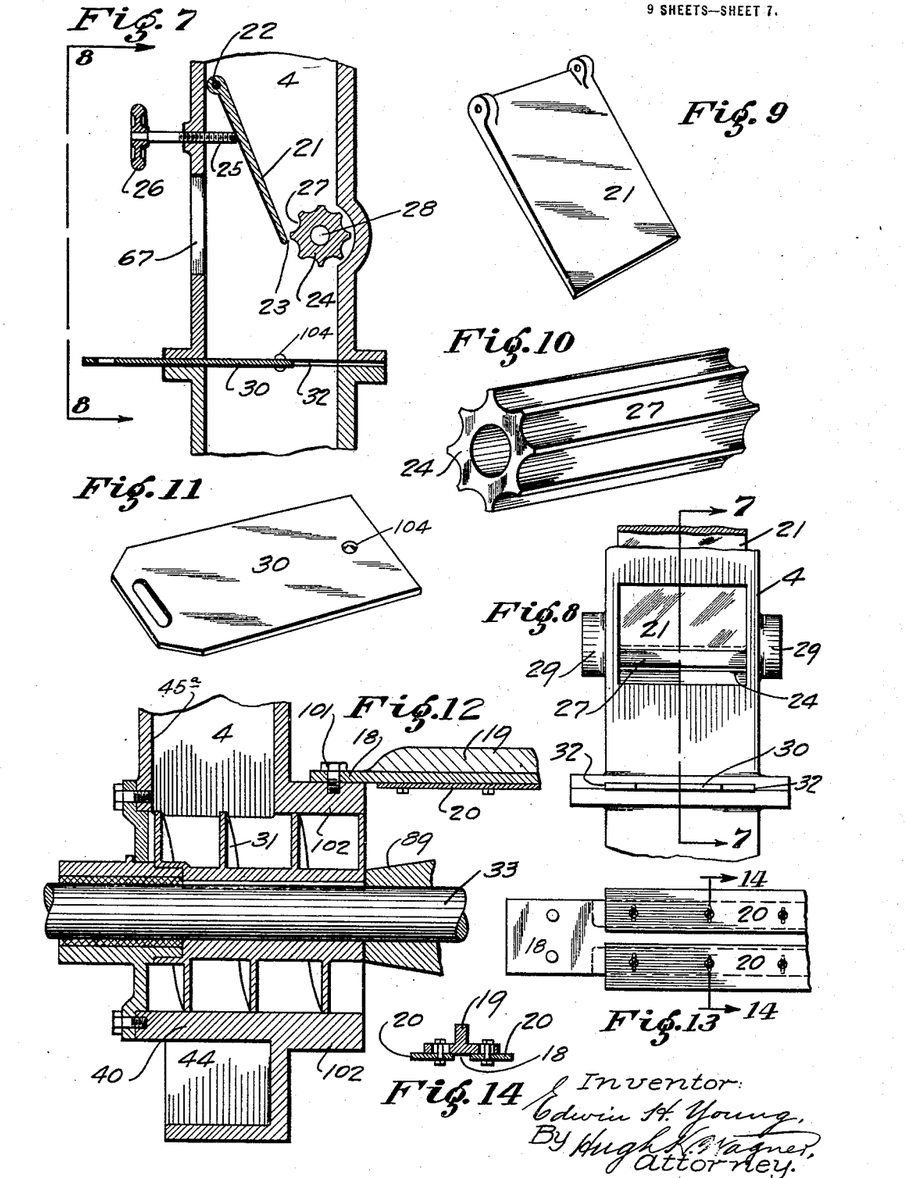
Fig. 7 is an enlarged sectional view of the seed inlet valve taken on the line 7—7 in Fig. 8, looking in the direction of the arrows.
Fig. 8 is a view taken on the line 8—8 in Fig. 7, looking in the direction of the arrows.
Fig. 9 is a perspective view of the hopper regulating-plate.
Fig. 10 is a perspective view of the hopper feeder-roll.
Fig. 11 is a perspective view of the hopper feed slide.
Fig. 12 is an enlarged section through the forced-seed conveyer, showing the conveyer abutting the center roll of the machine.
Fig. 13 is a bottom plan view of the stripper knives.
Fig. 14 is a section on the line 14—14 in Fig. 13, looking in the direction of the arrows.

The seed enters through pipe 2 or any other suitable chute or conveyer into the upper part of hopper 4 above the movable valve 21 pivoted at 22. The degree of opening or width of the passage 23 between the free end of the said valve 21 and the feed roll 24 is controlled by the adjusting screw 25 that passes through the wall of the hopper and is provided with a hand wheel 26. The amount of seed that can be fed is controllable by reason of the grooves 27 in the feed roll 24 which rotates upon shaft 28 journaled in bearings 29 in the side walls of the hopper 4. In case of emergency or for any other reason, the sliding gate 30 which is normally open to allow free passage of the seed from the upper part of hopper 4 to the lower part and open the force-feed screw 31 can be pushed to a closed position, the same being shown in Fig. 7 as partially closed. The said slide valve or gate slides in groove 32. The said screw 31 extends not only across the bottom of the hopper 4, but also into the delinting chamber 16 so that its action will be not only to move the seed out of the bottom of the hopper 4, but also to carry the same clear into the delining chamber and to present the seed under pressure to the action of the abrasive roll 15 and delinting rolls 17. At the point of entrance of the said screw 31 into the delinting chamber, it is snugly fitted by a collar 102 that confines the seed, resulting in its being forced under decided pressure well into the delinting chamber. Figs. 2 and 12 show the arrangement of the screw conveyer 31 relative to the bottom of the hopper 4 and to the delinting chamber.

The feed screw 31 and the roll 15 are both fixed to shaft 33, which is driven by pulley 34 or any other suitable source of power and is supported at one end by a standard 35 and at the other end by the head of standard 36, the said standards having respectively bearings 37 and 38 for the said shaft. Standard 39 supports the bottom plate 40 or hopper 4 and with standards 35 and 36 constitutes part of the main frame of the machine, the said standards being connected together by the frame member 41 and side bars 42, the heads 43 and 44 being mounted respectively on the said standards 36 and 39.

Endless conveyer screw 45 is mounted on a shaft 46 journaled at its ends in standards 36 and 39, which shaft is driven by pulley 47 and in turn by means of cable 48 drives shaft 28. By means of cable connection shaft 33 drives shaft 50, upon which is mounted the rotary fan 51 journaled at one end in the walls of the hopper and at the other end in bearing 60 in a casting forming the head 43. The lower part of the hopper 4 is in part formed by the head 44 and on the other side by the plate 45ª.

The fan 51 removes the lint that accumulates between the upper pair of delinting rollers 17, the said lint passing out of the delinting chamber between the knives 20 and the roll 17 and tending to accumulate on top of stave 18. The fan 51 prevents the accumulation of any lint that may sift out on top of stave 18 and knives 20 between the upper pair of rolls 17 by blowing the same away and causing it to fall over the said rolls 17 down into the trough 52 in the bottom of which the endless conveyer 45 is located.

The shafts 53 of the delinting rolls 17 are actuated by the spur gear 54 fixed to shaft 33, which gear 54 engages pinions 55 and thereby drives the shafts 53, thereby rotating the delinting roll 17.

Thus it will be observed that all the moving parts are driven in unison with and by shaft 33. The trough 52 is formed of casing 56 having converging side walls narrowing near the bottom to a size approximating that of the screw conveyer 45. As any lint that falls anywhere within the hood 57 will fall within the casing 56, all will be drawn by the suction of fan 11 (or any other suitably located suction means) through the opening 58 into chute 59, and thence into pipe 13 or into any other suitable receptacle.

Any seeds that escape between the knives 20 and the rolls 17 will either fall upon the screw conveyer 45 or strike the converging walls of casing 56 and will be conveyed by the said screw conveyer 45 along the bottom of the trough 52 to the pipe 6.

The main body of the delinted seeds will pass out of the valve chamber 68 at the end of the delinting chamber 16 through opening 14 into pipe 7, the seeds from both pipes 7 and 6 joining in pipe 5 to be conveyed to any suitable place or receptacle.

The strength of the air suction through chute 59 can be regulated by the sliding valves 61 and 62 located on opposite sides of the casing 56. The said valve 62 is in the casing proper, while the valve 61 is in the wall of the chute 59. Preferably there will be a plurality of valves 62 governing a plurality of openings 63 in the side of the wall of casing 56 where they are located. By adjusting the degree of opening of valves 61 and 62 relative to the openings 64 and 63 that they respectively control, the force of the air suction out of draft 52 into chute 59 and pipe 13 can be nicely regulated, and the opening of valve 61 allows inspection to see whether or not lint is passing.

Figure 3:
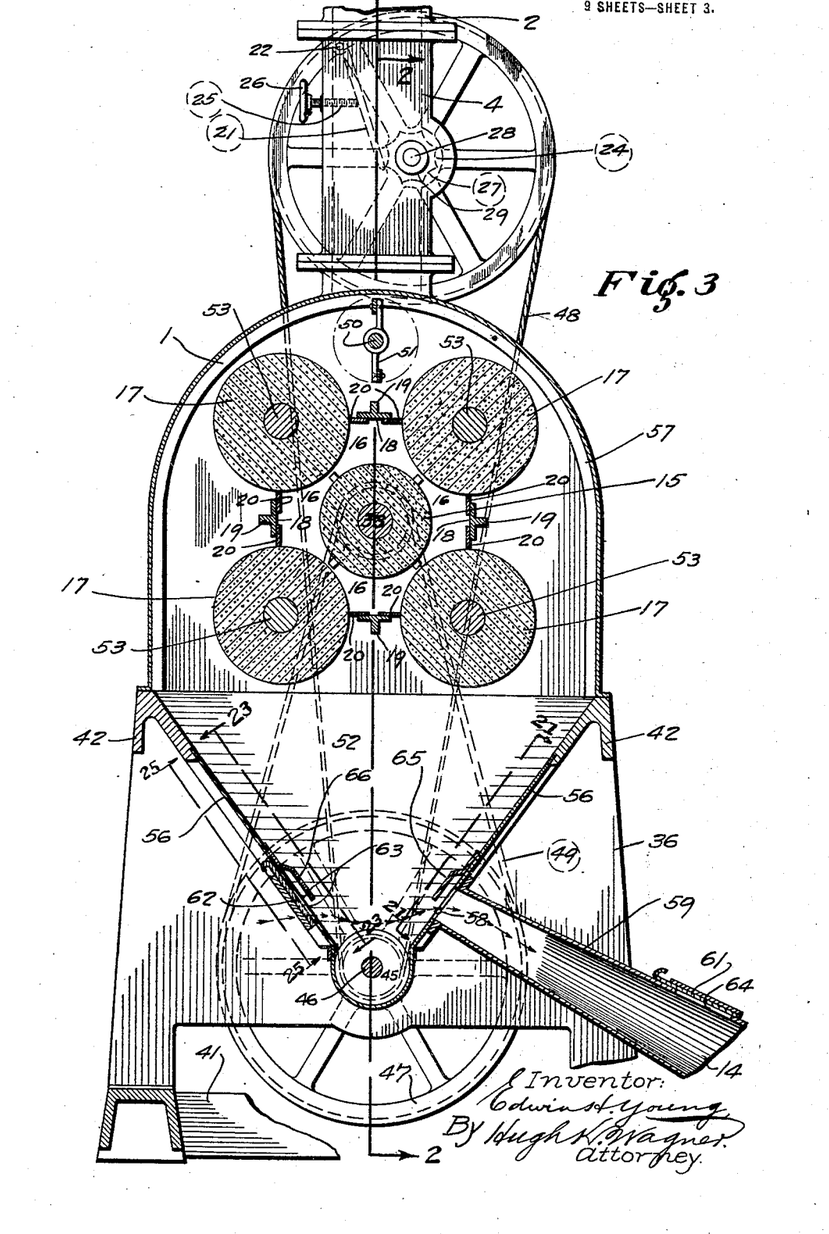
Fig. 3 is a sectional view on the line 3—3 in Figs. 2 and 6, looking in the direction of the arrows.
Figure 4:
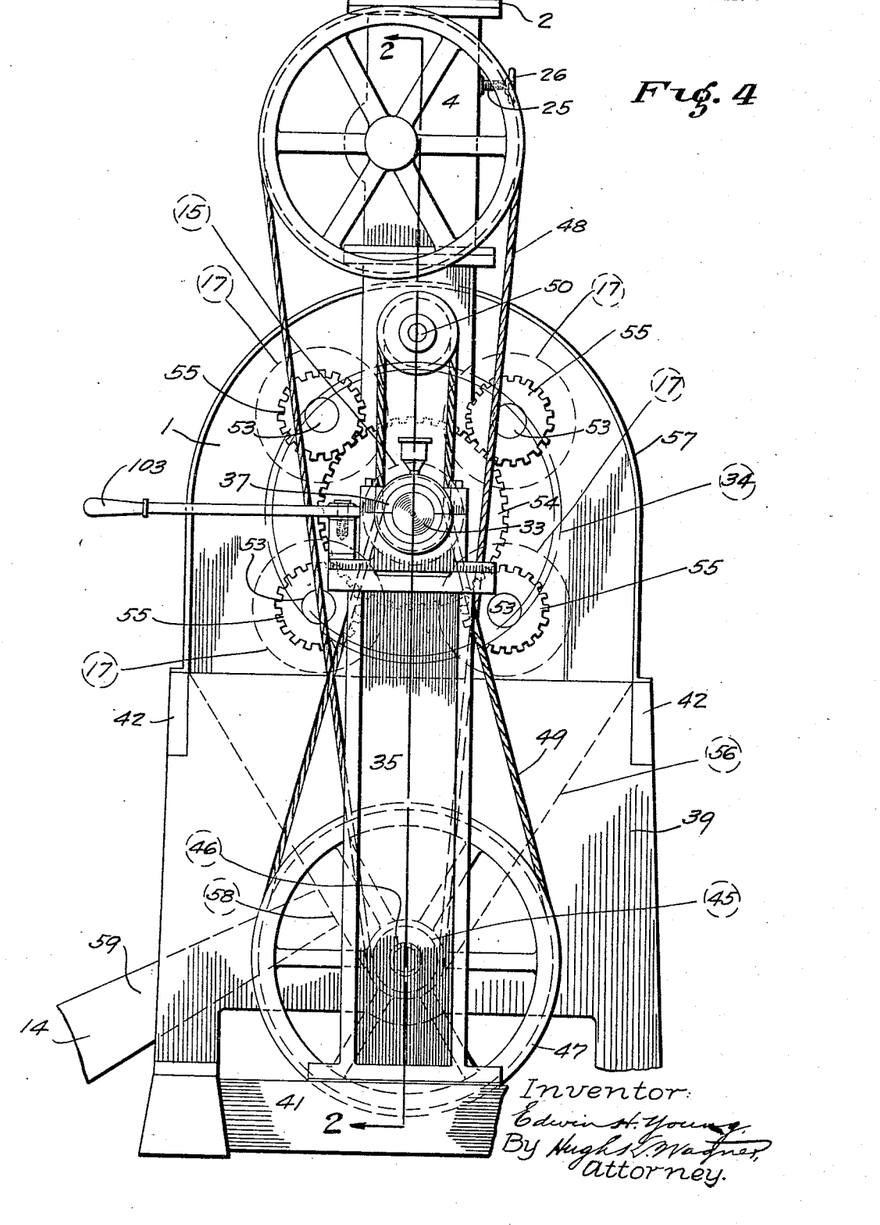
Fig. 4 is a sectional view on the line 4—4 in Figs. 2 and 6, looking in the direction of the arrows.
Figure 5:
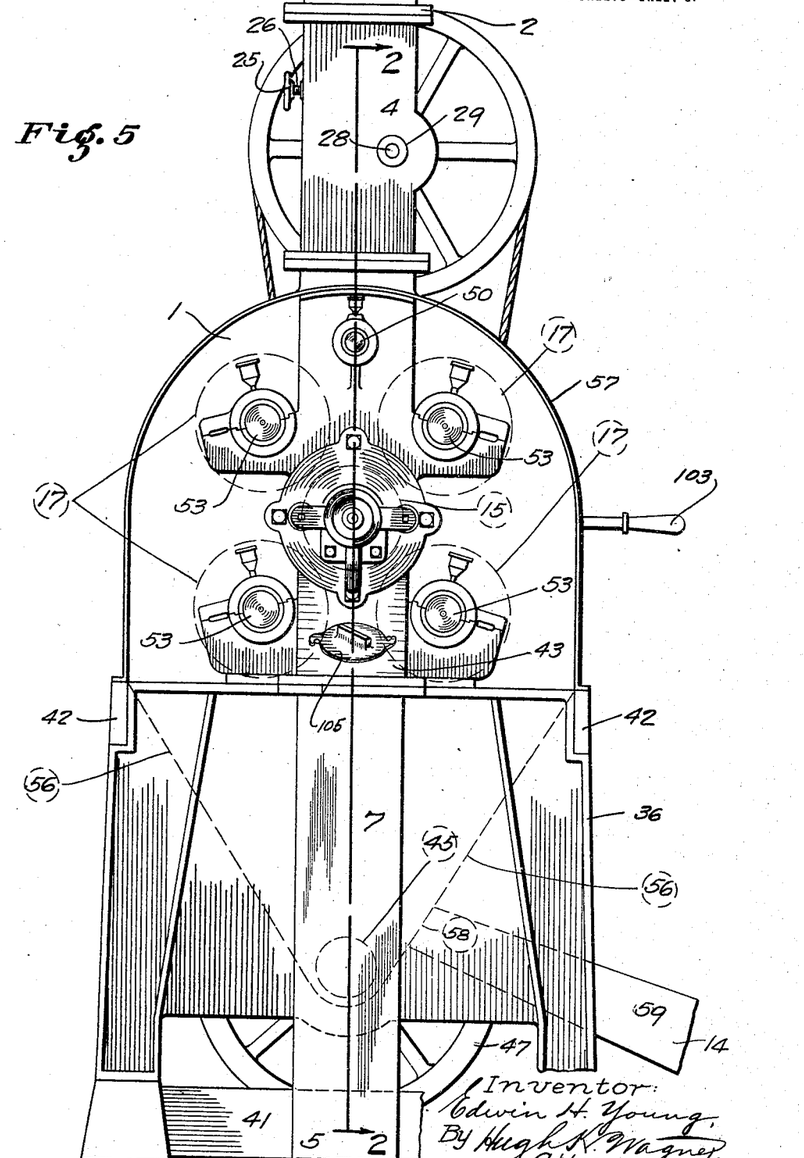
Fig. 5 is a sectional view on the line 5—5 in Figs. 2 and 6, looking in the direction of the arrows.
Figure 6:
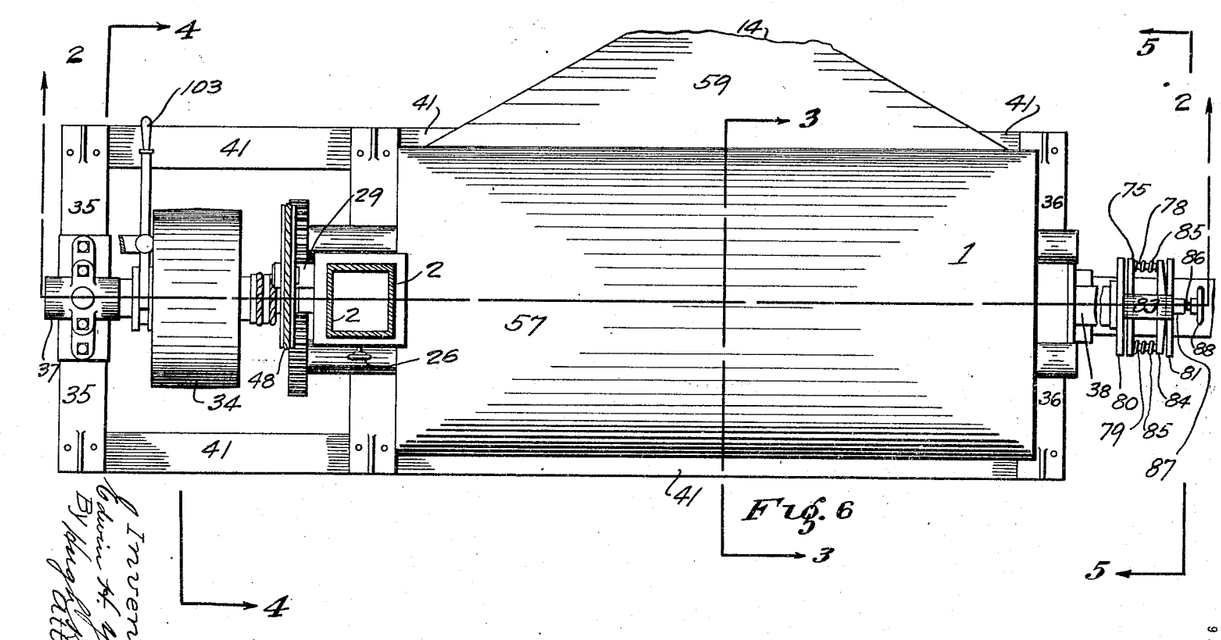
Fig. 6 is a top plan view.

It has been found preferable to guard the openings 58 and 63 respectively with baffle plates 65 and 66, so as to direct the air that enters through openings 63 down upon conveyer 45, the air following the direction of the arrow in Fig. 3. Thus all the lint that falls to the bottom of trough 52 is drawn out through opening 58.

In order perfectly to regulate the pressure upon the seeds to be delinted and so as to avoid even partial decortication thereof, an automatic valve (shown on an enlarged scale in Fig. 15) is located at the outlet end of the delinting chamber 16. It will be understood that the ceaseless rotation of feed screw 31 not only forces fresh seed into the delinting chamber 16, but also when the said delinting chamber is full of seed, exerts steady pressure thereon which, unless some of the seed escapes through an outlet, will cause the seed nearest the abrasive roll 15 or delinting roll 17 to be pressed into such close contact therewith as to produce either injury to the seeds or stoppage and damage to the machinery. When exactly the right pressure is attained and maintained the proper delinting of the seed is obtained. Although this apparatus provides for regulation by valves 21 and 30 and roll 24 for regulation of the inlet of the seed and the revolution of the feed screw 31 can be timed and sight hole 67 allows the operator to inspect the feeding operation, nevertheless proper regulation of the pressure of the seed within the delinting chamber 16 can be best secured by an automatic valve such as shown in Figs. 2, 5, 6, and 15. The feed screw 31, as well as the hopper 4, determines which is the inlet end of the delinting chamber 16, as the screw 31 causes an endless movement of seed away therefrom. In the rather long passage of the seed through the delinting chamber 16 they are continually agitated by the continuous rotation of the rolls 15 and 17 and thereby mixed so that in the course of travel of the seed through the delinting chamber 16 each seed is likely to come into contact with one or more of the rolls 17 and also the roll 15, and is thereby denuded of its lint, which being lighter than the seed, escapes between the knives 20 and the rolls 17 and becomes at once subject to the air suction through opening 58 and chute 59. By the time the seed reaches the outlet end of the delinting chamber 16 it has been thoroughly cleaned of lint. The rotation of the rolls 17 carries the lint clinging thereto past the knives 20 and the lint is thereupon gathered by air suction, as hereinbefore stated.

The head 43 contains a chamber 68 which communicates with the outlet end of the delinting chamber and also with the discharge pipe 7. Entrance into this pipe 7 is controlled by a valve 69 which is revolubly connected with the shaft 33 and snugly fits the chamber 68 at a point adjacent to the opening into pipe 7, the said valve 69 being provided with laterally extending pins 70 to agitate the seeds and prevent clogging.

Figure 15:
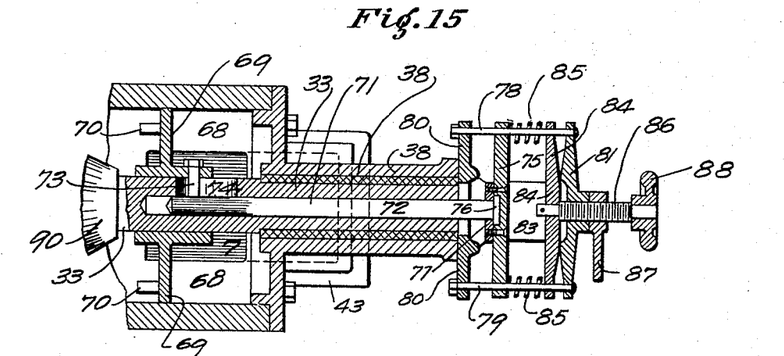
Fig. 15 is an enlarged sectional view of the pressure-adjuster discharge valve.
Figure 16:
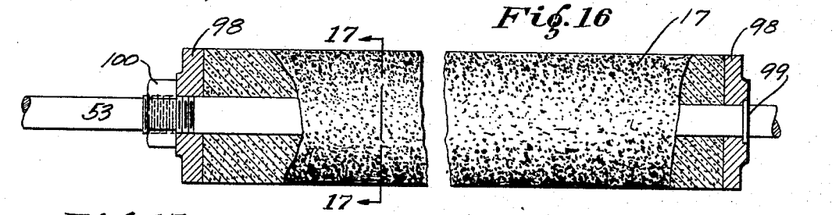
Fig. 16 is an enlarged side elevation (partly in section) of the delinter rolls.

Referring to Fig. 15, the end of the shaft 33 is formed of a longitudinally extending bore 71 in which is slidably mounted a stem 72, the inner end of which is connected to the valve 69 by a pin 73 which extends through a slotted opening 74 in the shaft 33 communicating with the bore 71. The outer end of the stem 72 is revolubly connected with a cross bar 75, the stem being provided with a head 76 fitted to a recess in the bar and held therein by a plate 77 so as to permit the stem to revolve relatively to the bar to cause the parts to move longitudinally with each other. Each end of the bar is strung on rods 78 and 79 which extend outwardly and are connected with plates 80 and 81, the plate 80 being bolted to the bearing 82 and the plate 81 being connected to the plate 80 by the web 83. Also strung upon the rods 78 and 79 is a second cross bar 84 and interposed between the respective cross bars 75 and 84 are coil springs 85. Threaded in the plate 81 is an adjusting screw 86, the inner unthreaded end of which is in swiveled connection with the bar 84 so that when the screw 86 is turned the bar 85 will be moved to adjust the tension of the springs. The screw 86 is provided with a lock nut 87 to lock it in its adjusted position and also a hand wheel 88 by which to turn it. By turning the hand wheel 88 the valve 69 may be so adjusted as to maintain a uniform pressure of seed in the delinting chamber as the seed is forced through the same by the action of the screw feed at the opposite end of the chamber. If the pressure becomes too great so as to endanger the seeds, the valve will yield against the tension of the springs 85. If the pressure decreases to such an extent that the seed will not be forced into proper contact with the delinting rolls sufficiently to enable the rolls adequately to remove the lint from the seed, the valve closes until the proper pressure is again established.

The delinting rolls 17 are preferably made of the same material as roll 15, the preferable material for which has been heretofore stated, but which may be emery, carborundum, or any other suitable abrasive material.

Figures 17, 18, 19:
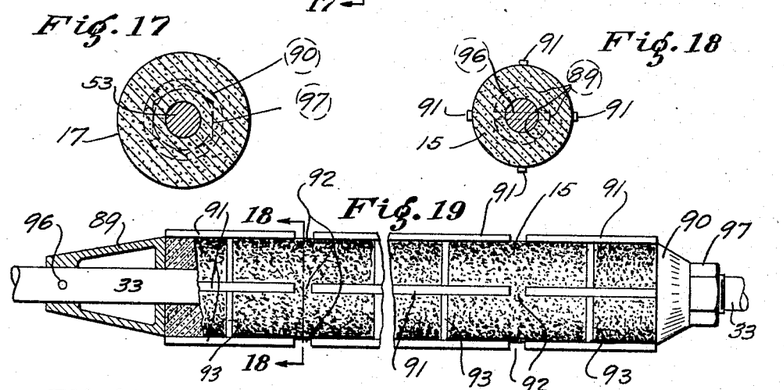
Fig. 17 is a sectional view on the line 17—17 in Fig. 16, looking in the direction of the arrows.
Fig. 18 is a sectional view on the line 18—18 in Fig. 19, looking in the direction of the arrows.
Fig. 19 is an enlarged side elevation (partly in section) of the center roll, showing one form of surface ribs.

In order that the seed may readily feed off of screw 31 upon the roll 15 and into the delinting chamber, the entrance end 89 of roll 15 is preferably beveled, as most clearly shown in Figs. 19, 2, and 12. The opposite end of the roll 15 is beveled at 90 in order to afford proper escape for the seeds from the delinting chamber 16 past valve 69.

Figure 20:
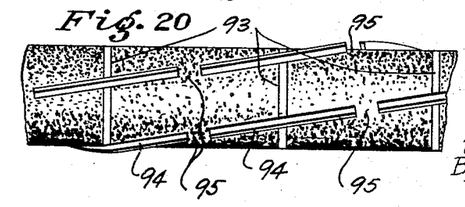
Fig. 20 is a side elevation of the center roll showing a different form of surface ribs, i. e., in helical arrangement.
Figures 21, 22, 23, 24, 25, 26, 27:
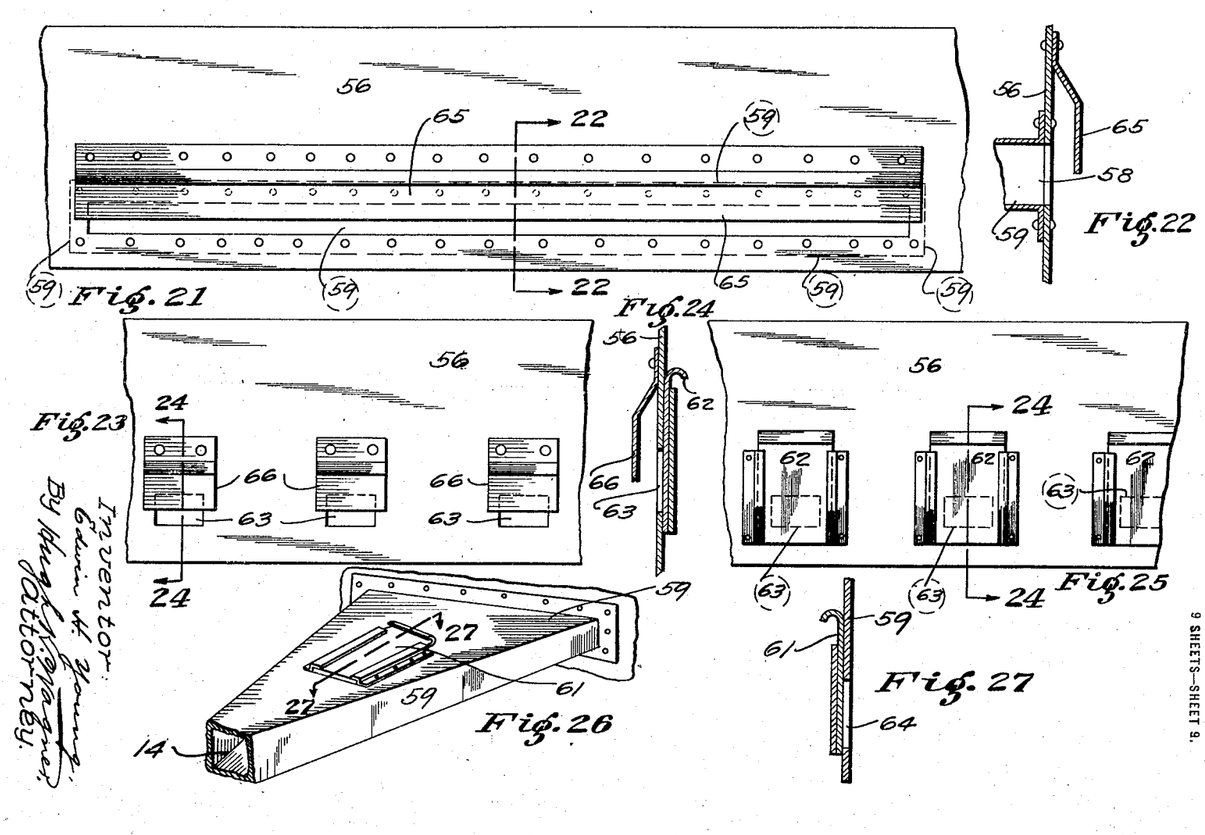
Fig. 21 is a view taken on the line 21—21 in Fig. 3, looking in the direction of the arrows.
Fig. 22 is a section taken on the line 22—22 in Fig. 21, looking in the direction of the arrows.
Fig. 23 is a view taken on the line 23—23 in Fig. 3, looking in the direction of the arrows.
Fig. 24 is a sectional view on the line 24—24 in Figs. 23 and 25, looking in the direction of the arrows.
Fig. 25 is a view taken on the line 25—25 in Fig. 3, looking in the direction of the arrows.
Fig. 26 is a perspective view of the lint discharge chute.
Fig. 27 is a sectional view on the line 27—27 in Fig. 26, looking in the direction of the arrows.

While the mere rotation of the rolls 17 and 15 coupled with the force feed action of screw 31 will agitate the seed in the delinting chamber, yet it may be preferable to provide some more positive agitating means upon roll 15 as shown in the drawings, such, for instance, as the blades 91 (see Figs. 19, 2 and 18) of which blades there will preferably be a plurality spaced apart by openings 92. The said blades will be fixed in collars 93 embedded in the material forming roll 15. In Fig. 20 the blades 94, spaced apart by openings 95 95 are, as a modification shows, helically arranged on the periphery of roll 15, which helical arrangement will produce a slightly different form and degree of agitation of the seed. When the blades are helically arranged as shown in Fig. 20, they tend to have the effect of a force feed screw. The spaces 92 between the blades 91 and the spaces 95 between the blades 94 permit the removing of undue pressure at any particular point as the seed can pass between the same and the ends and edges of the blades form additional abrading surfaces adapted to strip the lint from the seeds.

While the drawings illustrate rolls 15 and 17 as composed of an integral mass or cylinder of the preferred material, yet the same may, if desired, be formed in sections, i. e., of a plurality of cylinders, suitably connected together. The beveled parts 89 and 90 on roll 15 may preferably be formed of metal, the part 89 being pinned at 96 to the shaft 33, while the beveled collar 90 is held against roll 15 by the nut 97 and the parts 89 and 90 hold the roll 15 from longitudinal movement on shaft 33, to which it is fixed in any suitable manner.

Rolls 17 are similarly held from longitudinal movement on their respective shafts 53 (to which they are fixed in any suitable manner) by plates 98, shoulder 99, and nut 100.

The staves 18 are attached to the heads 43 and 44 at the ends of the said staves by any suitable means, such, for instance, as screws 101.

Reference to Fig. 15 of the drawings will show valve 69 clearly in its relation to the opening into the outlet opening from delinting chamber 16 into pipe 7 for the discharge of the seed. When the pressure in delinting chamber 16 becomes of a certain force, valve 69 will be pushed away from delinting chamber 16 so as to uncover, as shown in Fig. 15, the first part of the opening into pipe 7. If the pressure increases, the said opening will be further uncovered or enlarged. When the escape of a certain quantity of seed has reduced the pressure upon valve 69, the same being spring-pressed by the coil springs 85, the intermediate parts will automatically begin to close and return to closed position in which the valve 69 will be entirely to the left of the opening in the pipe 7 in Fig. 15. A nice adjustment of the automatic opening and closing of valve 69 can be regulated so as exactly to suit any temporary or permanent condition by turning the hand wheel 88, which by means of the screw 86 and plate 84 regulates the force of the springs 85.

The collar 102 on head 44 makes a cylindrical passage in which part of screw 31 fits very closely, forming practically part of the delinting chamber and leading underneath the staves 18 which partially form the delinting chamber and conducts the seed to such a point that the entire end of the screw 31 forces the same directly upon the bevel 89 of roll 15.

Lever 103 is used for turning on and off the power.

Rivet 104 prevents slide 30 moving farther than is desired.

Handhole plate 105 can be removed to inspect the passage of the seed in pipe 7.

The herein-described process of gathering the lint from the linter into an inclosed pipe, namely pipe 8, and of conveying the seed having thereon still some lint to the delinter 1, and then gathering the lint from the delinter 1 into an inclosed pipe, namely, the pipe 13, and returning the same to the linter 3, not only saves valuable lint, as hereinbefore stated, but, also, clarifies the air and saves employes from consumption, now common among those obliged to breathe lint-laden atmosphere where this process is not practised.

Having thus described this invention, I hereby reserve the benefit of all changes in form, arrangement, order, or use of parts, as may exist within the scope of the following claims.

I claim:

1. In a delinting machine for cotton seed, a plurality of delinting rolls surrounding a chamber, a centrally arranged float in said chamber, said chamber having inlet and outlet openings, a force feed device at the inlet opening, and a valve at the outlet opening together with means for yieldably holding the valve toward closing position, the said valve comprising a rotatable member adapted to control the said outlet and having agitating means upon its face presented toward the delinting chamber.

2. In a delinting machine for cotton seed, a plurality of delinting rolls surrounding a chamber, a centrally arranged float in said chamber, said chamber having inlet and outlet openings, a force feed device at the inlet opening, and a valve at the outlet opening together with means for yieldably holding the valve toward closing position, the said valve comprising a rotatable member so mounted on the shaft of the said float as to rotate therewith and also to slide longitudinally relative thereto, the said shaft containing a bore in its end and a slot communicating from its periphery to the said bore, there being a longitudinally movable stem within the said bore and means for connecting the same with screw-adjusting means, and spring pressed members forming the means for yieldably holding the valve toward closing position.

3. In a delinting machine for cotton seed, a plurality of delinting rolls surrounding a delinting chamber, means for feeding said seed through said chamber, a rotatable yieldable valve at the outlet opening, and an agitator connected to said valve.

4. In a delinting machine for cotton seed, a plurality of longitudinally arranged delinting rolls surrounding a delinting chamber, said chamber having inlet and outlet openings, a vertically-arranged hopper communicating with the inlet opening, said inlet opening being cylindrical in form, a force feed screw beneath said hopper and snugly fitting said cylindrical inlet opening, a centrally-arranged roll in said delinting chamber, a valve at the outlet opening of said delinting chamber together with means for yieldably holding said valve toward closing position, a casing underlying the said delinting chamber, a screw conveyer at the bottom of the said casing, and pipes leading from the said screw conveyer and from the said outlet opening.

5. In a machine of the character described, the combination of a plurality of parallel horizontally arranged delinting rolls, means intermediate the same for closing the space between them, thereby forming a delinting chamber, a casing underneath the said rolls adapted to catch lint emerging from the said delinting chamber, a discharge chute leading from the interior of the said casing, suction means for drawing the said lint out of the said casing into the said chute, an air draft regulator in the said chute, a plurality of air draft valve regulators in the wall of the said casing, and a baffle plate guarding each opening governed by such valve.

In testimony whereof I hereunto affix my signature.

EDWIN H. YOUNG.

Copies of this patent may be obtained for five cents each, by addressing the "Commissioner of Patents, Washington, D. C."